United States Patent [19]
Housley

[11] Patent Number: 5,988,045
[45] Date of Patent: Nov. 23, 1999

[54] UTENSIL SUPPORTING MULTIPLE COOKING ENVIRONMENTS FOR PREPARING FOODS

[76] Inventor: Todd B. Housley, 2501 Powderhorn, Plano, Tex. 75025

[21] Appl. No.: 09/163,502

[22] Filed: Sep. 30, 1998

[51] Int. Cl.[6] .............................. A47J 27/00; A47J 37/00; A47J 27/04

[52] U.S. Cl. ............................... 99/339; 99/400; 99/426; 99/446; 99/448; 99/450; 126/20; 126/369; 219/401

[58] Field of Search .............................. 99/339, 340, 352, 99/400, 401, 426, 444–450, 482, 476, 410–418; 122/40, 31.1; 126/20, 369; 219/401, 441, 442, 678, 725–735; 220/425, 428, 753, 912, 4.01; 426/510, 511, 523; D7/354–361

[56] References Cited

U.S. PATENT DOCUMENTS

| | | | |
|---|---|---|---|
| 176,524 | 4/1876 | Elmore | 99/339 |
| 197,871 | 12/1877 | Lightfoot | 99/340 X |
| D. 275,440 | 9/1984 | Matsuhisa | D7/357 |
| 1,103,169 | 7/1914 | Beam . | |
| 1,862,420 | 6/1932 | O'Brien | 99/339 |
| 2,742,850 | 4/1956 | Fond | 99/339 |
| 2,932,293 | 4/1960 | Rassieur | 99/416 X |
| 3,199,438 | 8/1965 | Myler et al. | 99/446 X |
| 3,299,800 | 1/1967 | Angelo | 99/340 X |
| 4,081,646 | 3/1978 | Goltsos | 219/10.55 E |
| 4,486,640 | 12/1984 | Bowen et al. | 219/10.55 E |
| 4,941,401 | 7/1990 | Sarnoff et al. | 126/369 X |
| 5,076,155 | 12/1991 | Golob | 99/450 X |
| 5,097,753 | 3/1992 | Naft | 219/401 X |
| 5,211,105 | 5/1993 | Liu | 99/400 X |
| 5,275,094 | 1/1994 | Naft | 99/416 |
| 5,473,980 | 12/1995 | Carpenter | 99/446 |
| 5,511,466 | 4/1996 | Dzibinski | 220/912 X |

OTHER PUBLICATIONS

"Microwise" information brochure, DTR, Framington, Massachusetts, 1 page, undated.

Primary Examiner—Timothy Simone
Attorney, Agent, or Firm—Madson & Metcalf

[57] ABSTRACT

A utensil supporting multiple cooking environments for preparing foods is disclosed in one presently preferred embodiment of the present invention as including a cooking grill and a cover member selectively disposed in relation to a base unit comprising one or more cooking compartments. The cooking grill having a cooking surface and a collection reservoir disposed beneath at least a portion of the cooking surface. Formed in the upper cooking surface of the cooking grill are a plurality of openings. Collection channels may also be disposed along the upper cooking surface so as to provide device for feeding run-off liquids through the openings and into the underlying collection reservoir of the cooking grill. Having a dimensional size and shape substantially corresponding to the outer perimeter of the base unit, the cooking grill, when selectively disposed over the internal periphery of the base unit, facilitates a first cooking environment within the base unit. The air generally sealed within the first cooking environment may circulate around the food items retained within the various cooking compartments to provide device for preparing the food items contained therein. The cooking grill supports a second cooking environment for preparing foods, wherein liquids (i.e., water, oil, grease, etc.) may be collected from those food items disposed on or suspended above the upper cooking surface of the cooking grill. Depending upon whether the cover member is selectively positioned in supportable relation to the base unit and over the cooking grill, the second environment may facilitate the preparation of food items by means of grilling, baking, roasting and/or broiling. In addition, water may be introduced into the collection reservoir of the cooking grill to provide device for steaming the food item(s) disposed within the second environment.

18 Claims, 5 Drawing Sheets

UTENSIL SUPPORTING MULTIPLE COOKING ENVIRONMENTS FOR PREPARING FOODS

BACKGROUND

1. The Field of the Invention

This invention relates to food preparation devices and, more particularly, to novel utensils supporting multiple cooking environments for preparing foods.

2. The Background Art

Cooking utensils have been developed and used throughout the years. Traditionally, cooking utensils facilitate a cooking surface that supports a single cooking, environment for preparing foods (e.g., baking pans, casserole dishes, rice cookers, frying pans, woks, etc.). In addition, those skilled in the art invented cooking utensils having a single cooking surface for preparing foods and for also accommodating additional functional purposes.

For example, those skilled in the art developed combination dish drainer, steamer, roaster and baking pans consisting essentially of a collection pan, a cover and a drainer. As disclosed in U.S. Pat. No. 1,103,169, the pan generally includes triangular support lugs formed in the corners of its interior periphery so as to provide a shoulder for supporting the drainer therein. The drainer formed having a size and shape adapted to be inserted into the upper portion of the pan. The drainer may consist of a bottom surface formed with transverse corrugations and openings in the bottoms of channels between the ridges formed by the corrugations. A central portion of the bottom of the drainer may be formed with a cross-sectionally inverted V-shaped transversely arranged upwardly extending support that projects above the side walls of the drainer. When the device is used as a dish drainer, dishes to be drained are arranged to bear against and be supported by the inverted cone. A cover may then be positioned over the drainer and the dishes supportably disposed therein. In operation, a suitable amount of water may be poured into the pan and then heated. The steam generated from the water will be caused to thoroughly cleanse the dishes and then the remaining water can be effectively drained from the internal periphery of the collection pan upon completion of the process.

Another prior art combination food preparation device is set forth in U.S. Pat. No. 4,486,640. As disclosed, the utensil for cooking or baking in a microwave oven generally comprises a partitioned tray and cover held in substantially fixed horizontal alignment by a microwave transparent base. The tray and cover are metallic and provide means for shielding the interior of the tray from microwave energy. Correspondingly, a ferrite layer is formed on the underside of the tray to absorb microwave energy and thereby provide heat which conducts through the tray to the partitioned cooking compartments. To accommodate the cooking or baking process, a plurality of apertures are formed in the cover to facilitate the escape of steam from the interior of the tray.

Although food preparation devices have been found to be generally useful, prior art cooking utensils incorporate several inherent disadvantages in relation to supporting more than a single cooking environment for preparing foods. As will be further appreciated by those skilled in this particular art, economic considerations are significant when dealing with this highly competitive industry, since comparatively numerous cooking components or utensils are needed to support multiple cooking environments for simultaneously preparing foods and, thereby, are frequently found to be commercially impractical in collection. In this regard, even a slight savings in cost by way of reducing the number of cooking utensils needed to simultaneously accommodate multiple cooking environments in a single cooking utensil will substantially increase or enhance its commercial appeal when considering relevant issues of application and/or mass production. Correspondingly, the present invention provides a single utensil capable of supporting multiple cooking environments for preparing foods which overcomes several deficiencies of prior art food preparation devices and resolves several problems left unsolved by the known prior art.

BRIEF SUMMARY OF THE INVENTION

In accordance with the invention as embodied and broadly described herein, a utensil supporting multiple cooking environments for preparing foods is disclosed in one presently preferred embodiment of the present invention as including a cooking grill and a cover member selectively disposed in relation to a base unit. Preferably, the base unit is formed comprising one or more cooking compartments. Each of the cooking compartments is formed having a dimensional size and shape sufficient for retaining one or more food items within its internal periphery. Structurally, each of the cooking compartments of the base unit comprise means for isolating one or more food items and its respective juices within the dimensional periphery of the cooking compartment from mixing with food item(s) retained in other cooking compartments. The base unit further includes a first support ridge for selectively supporting the cooking grill and a second support ridge for selectively supporting the cover member in supportable relation thereto.

In preferred design, the cooking grill is formed having an upper cooking surface and a collection reservoir disposed beneath at least a portion of the upper cooking surface. Preferably formed in the upper surface of the cooking grill are a plurality of openings. In cooperation with the openings, collection channels may also be disposed along the upper cooking surface so as to provide means for feeding run-off liquids through the openings in the upper cooking surface and into the underlying collection chamber of the cooking grill.

In one presently preferred embodiment of the present invention, the cooking grill is formed having a dimensional outer perimeter that substantially corresponds to the perimeter of the first support ridge of the base unit. When selectively disposed over the internal chamber and various cooking compartments of the base unit, the grill cover facilitates a first cooking environment within the internal periphery of the base unit. The air sealed within the base unit may circulate around the food items retained within the various cooking compartments, thus providing means for preparing the various food items for consumption. For purposes of this description, the first cooking environment may facilitate, but is not intended to be limited to, an environment for preparing foods by means of baking, roasting, broiling and/or sauteing.

As will be further appreciated, the upper cooking surface of the cooking grill provides a second cooking environment for preparing foods, wherein liquids (e.g., water, oil, grease, etc.) may be collected from one or more food items positioned on or suspended above the upper cooking surface of the cooking grill. Depending upon the disposition of the cover member which may be mounted in supportable relation to the second support ridge of the base unit and over the cooking grill, the second cooking environment may facilitate, but is not intended to be limited to, an environment for preparing foods by means of grilling, baking, roasting and/or broiling. In addition, a fluid (i.e., water) may be introduced within the collection reservoir of the cooking grill to provide means for steaming one or more food items positioned on or suspended above the upper cooking surface of the cooking grill.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 7, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

Figure 1:
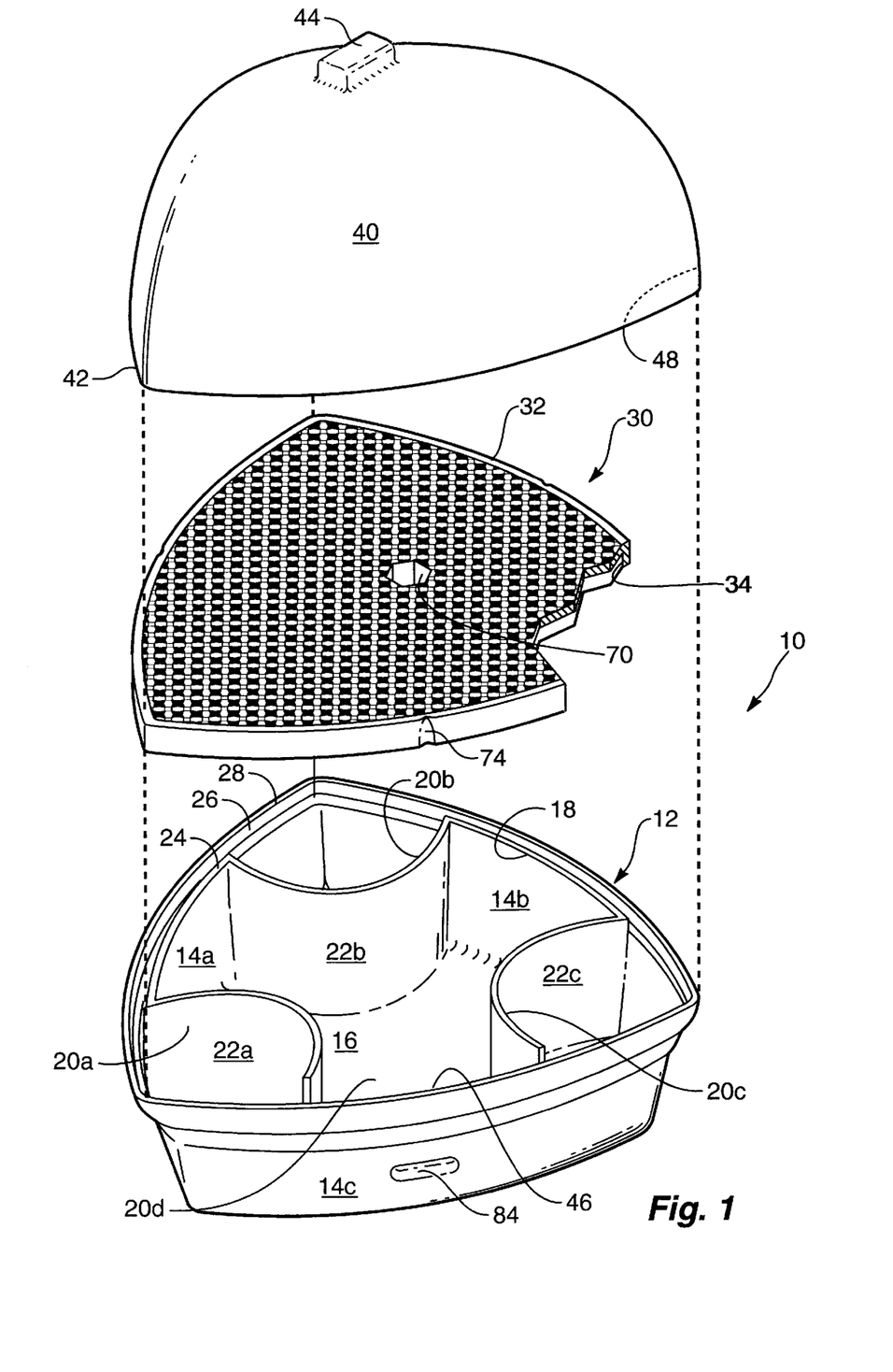
FIG. 1 is a perspective view of a utensil supporting multiple cooking environments for preparing foods in accordance with one presently preferred embodiment of the present invention.

One presently preferred embodiment of the present invention, designated generally at 10, is best illustrated in FIG. 1. As shown, the utensil supporting multiple cooking environments for preparing foods 10 is preferably formed including a cooking grill 30 and a cover member 40 selectively disposed in relation to a base unit 12. In preferred design, the structural components of the cooking utensil 10 (e.g., the base unit 12, the cooking grill 30 and the cover member 40) are generally formed having an overall dimensional size and shape sufficient for being introduced within the internal periphery of a conventional gas or electric oven, stove or microwave.

As will be appreciated by those skilled in the art, the cooking utensil 10 is preferably formed of sufficiently sturdy material capable of undergoing elevated temperatures and/or microwave energy. For example, the various structural components of the cooking utensil 10 may be formed of ceramic (e.g., Corningware™), glass (e.g., Pyrex™) or a polymeric material sufficient for resisting degradation at elevated temperatures and/or the exposure to microwave energy (e.g., a thermoset polyester or any of numerous other organic, synthetic or processed materials that are mostly thermoplastic or thermosetting polymers of high molecular weight with or without additives, such as, plasticizers, auto oxidants, colorants, or fillers, which can be shaped, molded, cast, extruded, drawn, foamed or laminated into objects, films, or filaments transparent to microwave energy).

In one presently preferred embodiment of the present invention, the cooking utensil 10 is formed comprising a general triangular configuration. Although the present invention is illustrated and described in connection with a general triangular configuration, those skilled in the art will recognize that various other geometrical configurations are likewise suitable, such as, for example, circular, rectangular, square, oblong, etc., which are consistent with the spirit and scope of the present invention and are thereby intended to be contemplated herein. The use of a general triangular configuration in relation to the cooking utensil 10 is thus by way of illustration only and not by way of limitation.

Figure 2:
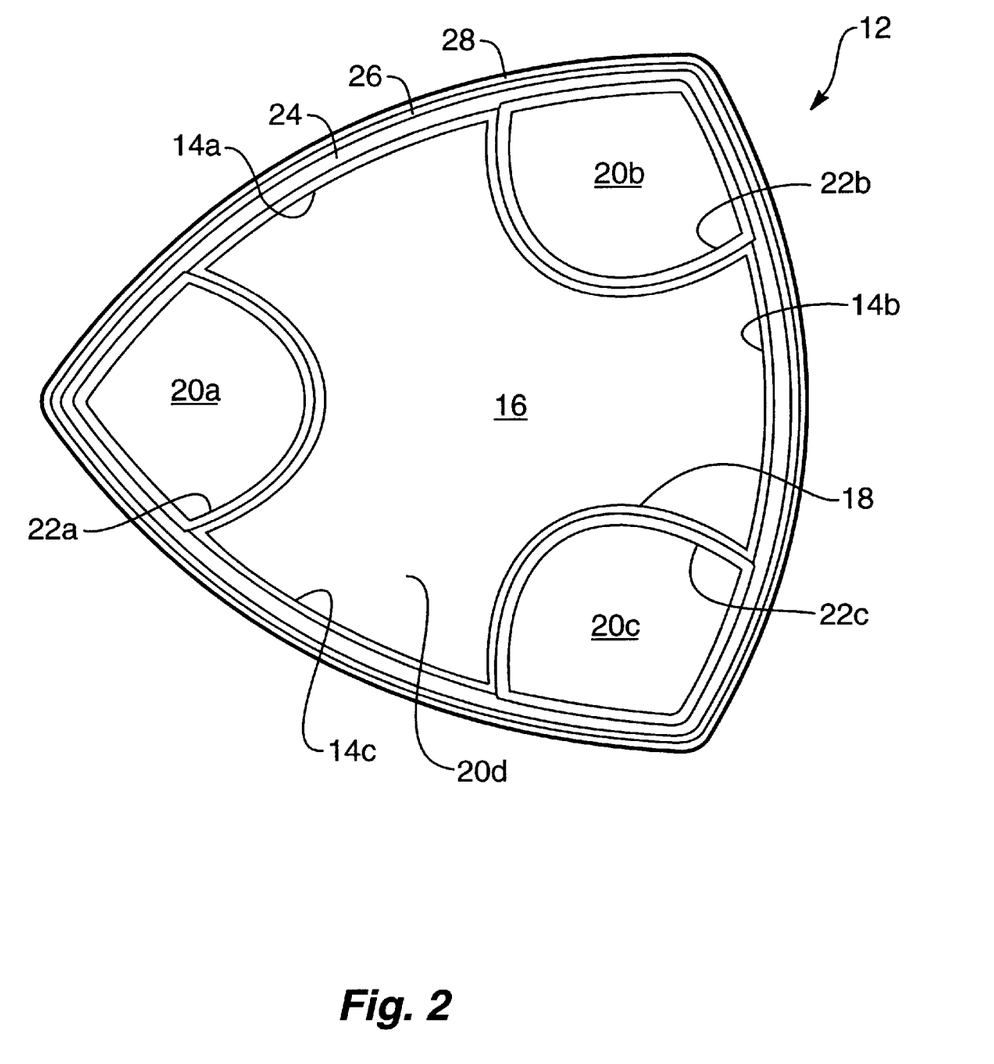
FIG. 2 is a top plan view of one presently preferred embodiment of the various cooking compartments formed in relation to a base unit of the utensil supporting multiple cooking environments for preparing foods as illustrated in FIG. 1.

Consistent with having a general triangular configuration, as noted above, the base unit 12 is preferably formed comprising a first side wall 14a, a second side wall 14b and a third side wall 14c disposed perpendicular to a surface flooring 16, as best illustrated in FIGS. 1 and 2. In structural relationship to each other, the side walls 14a, 14b, 14c form the outer perimeter of an internal chamber 18, wherein the surface flooring 16 provides a bottom. In one presently preferred embodiment of the present invention, the side walls 14a 14b, 14c of the base unit 12 comprise a dimensional height of between approximately 6.25 cm and 12.5 cm, and preferably about 7.5 cm. It will be readily appreciated, however, that other dimensional sizes of the side walls 14a, 14b, 14c of the base unit 12 are possible. It is intended, therefore, that the examples provided herein be viewed as exemplary of the principles of the present invention, and not as restrictive to a particular structural size or configuration for implementing those principles.

The internal chamber 18 of the base unit 12 may include one or more cooking compartments 20, wherein each cooking compartment 20 is formed having a dimensional size and shape sufficient for introducing and retaining one or more food item(s) therein. In one presently preferred embodiment of the cooking utensil 10 of the present invention, three separate and distinct cooking compartments 20a, 20b, 20c are formed at the angular corners of the base unit 12. Each of the cooking compartments 20a, 20b, 20c comprises a periphery wall 22a, 22b, 22c, respectively, which projects substantially upward from the surface flooring 16 of the base unit 12 to a dimensional height that does not extend beyond a first support ridge 24 of the base unit 12.

In preferred construction, the periphery wall 22a of the first cooking compartment 20a may be formed having a general arcuate shape and including opposing ends that engage the respective side walls 14a, 14c of the base unit 12. The periphery wall 22b of the second cooking compartment 20b may be formed having a general arcuate shape and including opposing ends that engage the respective side walls 14a, 14b of the base unit 12. In addition, the periphery wall 22c of the third cooking compartment 20c may be formed having a general arcuate shape and including opposing ends that engage the respective side walls 14b, 14c of the base unit 12. Correspondingly, a central cooking compartment 20d is preferably formed within the perimeter defined by the first, second and third side walls 14a, 14b, 14c and between each of the periphery walls 22a, 22b, 22c of the three cooking compartments 20a, 20b, 20c, respectively. Although the present invention is illustrated and described in connection with general arcuate shaped periphery walls 22a, 22b, 22c, those skilled in the art will recognize that various other geometrical configurations are likewise suitable. The use of general arcuate shaped periphery walls 22a, 22b, 22c is thus by way of illustration only and not by way of limitation.

The cooking compartments 20a, 20b, 20c, 20d of the base unit 12 are preferably formed having a dimensional internal periphery sufficient for introducing and retaining one or more food items therein. Structurally, each of the cooking compartments 20a, 20b, 20c, 20d provides means for isolating one or more food items and its respective juices retained therein from mixing with foods retained in the other cooking compartments. For example, meats, vegetables, fruits, cereals, etc. may be introduced into the respective cooking compartments 20a, 20b, 20c, 20d to be prepared for consumption. Moreover, an egg may be introduced into the internal periphery of a cooking compartment 20 for the purpose of pouching the egg.

As best illustrated in FIGS. 1 and 2, a first support ridge 24 is formed along the outer perimeter of the base unit 12 and provides a means for supporting the cooking grill 30 in relation to an upper portion of the internal chamber 18 of the base unit 12. In this regard, the first support ridge 24 is preferably formed having a perimeter comprising a dimensional size and shape sufficient for selectively supporting the cooking grill 30 in supportable relation thereto. Similarly, a second support ridge 26 is formed along the outer perimeter of the base unit 12. The second support ridge 26 having a perimeter comprising a dimensional size and shape sufficient for selectively supporting the cover member 40 in supportable relation with the base unit 12. As shown, the second support ridge 26 of the base unit 12 is preferably formed consisting of an outer perimeter that is peripherally larger than the outer perimeter of the first support ridge 24 so as to provide for the selective positioning of the cover member 40 in relation to the base unit 12 and over the cooking grill 30.

Figure 3:
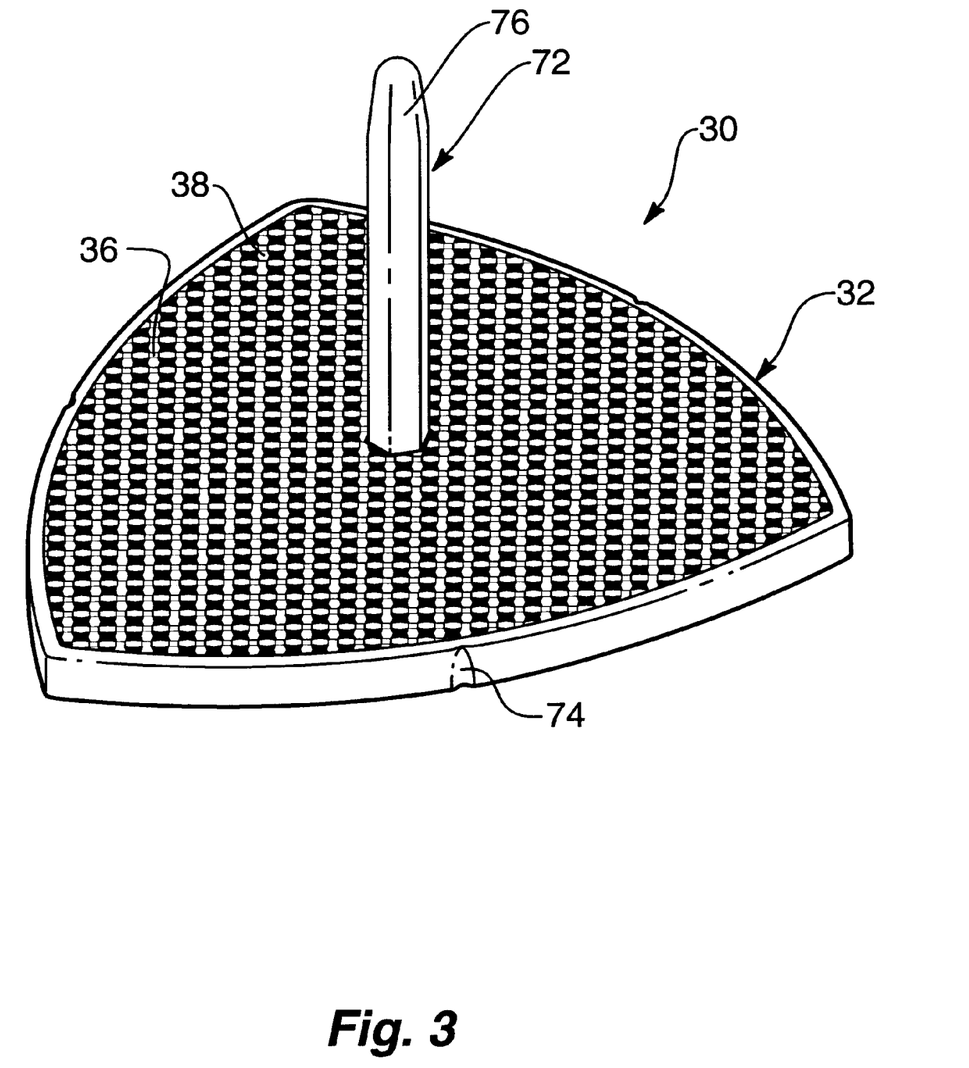
FIG. 3 is a perspective view of one presently preferred embodiment of an upper surface of a cooking grill of the utensil supporting multiple cooking environments for preparing foods as shown in FIG. 1.

Referring now to FIGS. 1 and 3, the cooking grill 30 is formed having an upper cooking surface 32 and a collection reservoir 34 disposed beneath at least a portion of the upper cooking surface 32. A plurality of openings 36 are preferably formed in the surface facing of the upper cooking surface 32 of the cooking grill 30. In cooperation with the plurality of openings 36, collection channels 38 may be formed in the upper cooking surface 32 so as to provide means for feeding run-off liquids (e.g., water, oil grease, etc.) through the openings 36 and into the underlying collection reservoir 34 of the cooking grill 30. Functionally, the collection reservoir 34 of the cooking grill 30 provides means for collecting run-off liquids extracted from food item(s) positioned on or suspended above the upper cooking surface 32. The liquids generally flow by way of gravity into the collection channels 38 which tend to divert the fluid flow through the openings 36 formed in the upper cooking surface 32 of the cooking grill 30 and into the collection reservoir 34 for accumulation.

In preferred structural design, the cooking grill 30 is formed having an outer perimeter comprising a dimensional size and shape that substantially corresponds to the perimeter of the first support ridge 24 of the base unit 12. In one presently preferred embodiment of the present invention, the cooking grill 30 consists of a dimensional width of between approximately 2.5 cm and 5 cm, and preferably about 3.75 cm. It will be readily appreciated by those skilled in the art, however, that other dimensional sizes of the cooking grill 30 are possible. It is intended, therefore, that the examples provided herein be viewed as exemplary of the principles of the present invention, and not as restrictive to a particular structure for implementing those principles.

When selectively disposed over the internal periphery of the base unit 12, the grill cover 30 facilitates a first cooking environment 46 within the internal chamber 18 and the cooking compartments 20 in the base unit 12. The air generally sealed within the base unit 12 may circulate around the food items disposed within one or more cooking compartments 20, thus providing means for preparing the various food items for consumption. For the purpose of this description, the first cooking, environment 46 may facilitate, but is not intended to be limited to, an environment for preparing foods by means of baking, roasting, broiling and/or sauteing.

As illustrated in FIGS. 1 and 3, the cooking grill 30 may be formed comprising one or more venting structures 74 that function to facilitate venting of the internal chamber 18 of the base unit 12. In one presently preferred embodiment of the present invention, at least one venting structure 74 having a general V-shaped configuration is formed in each of the opposing sides of the cooking grill 30 so as to facilitate the venting of the internal chamber 18 of the base unit 12. The venting structures 74 preferably comprise structural indentations formed along the exterior surface facing of the opposing sides of the cooking grill 30. These venting structures 74 include a dimensional surface area which is sufficient to allow venting access from the internal chamber 18 of the base unit 12. As will be appreciated, those skilled in the art will readily recognize other possible modifications and adaptations for venting the internal chamber 18 of the base unit 12 which are consistent with the spirit and scope of the present invention and therefore contemplated herein.

As will be appreciated by those skilled in the art, the cooking grill 30 provides a second environment 48 for preparing foods, wherein liquids may be collected from one or more food items positioned on or suspended above the upper cooking surface 32 of the cooking grill 30. Depending upon the disposition of the cover member 40 in supportable relation to the second support ridge 26 of the base unit 12 and over the cooking grill 30, the second cooking environment 48 may facilitate, but is not intended to be limited to, an environment for preparing foods by means of grilling, baking, roasting and/or broiling. If desired, water may be introduced into at least a portion of the dimensional periphery of the collection reservoir 34 of the cooking grill 30 in order to facilitate means for steaming one ore more food items positioned on or above the upper cooking surface 32 of the cooking grill 30.

Still referring to FIGS. 1 and 3, a support aperture 70 may be formed in the central portion of the upper cooking surface 32 of the cooking grill 30. In one presently preferred embodiment, the support aperture 70 may be formed having a dimensional size and shape sufficient for introducing and retaining a leading end of a support rod 72 in supportable engagement therewith. In operation, the support rod 72 may be removably introduced into the internal periphery of the support aperture 70, thereby facilitating means for structurally supporting the support rod 72 and one or more food items (e.g., chicken, pork, beef, corn on the cob, etc.) in suspended relation to the upper cooking surface 32 of the cooking grill 30 and within the second cooking environment 48 of the cooking utensil 10. As anticipated herein, the second cooking environment 48 may support, but is not intended to be limited to, a cooking environment sufficient for preparing foods by means of roasting.

In one presently preferred embodiment of the present invention, the support rod 72 is formed having a general hexagonal shape. Similarly, the support aperture 70 formed in the upper cooking surface 32 of the cooking grill 30 comprises a general hexagonal shape having an internal periphery that is slightly larger than the outer periphery of the support rod 72. The support aperture 70 may be formed having a tapered body lengthwise so as to facilitate partial angular movement of the support rod 72 when disposed within the internal periphery of the support aperture 70 at its open end. It will be readily appreciated, however, that the support aperture 70 does not need to be tapered dimensionally to sufficiently support the support rod 72 in relation therewith.

Referring to FIG. 1, the cover member 40 preferably includes a flange 42 comprising an outer perimeter having a dimensional size and shape sufficient for being selectively disposed in supportable relation to the second support ridge 26 of the base unit 12. In one presently preferred embodiment of the present invention, as noted above, the cover member 40 is preferably formed having a general triangular configurational that substantially corresponds with the general triangular configuration of the base unit 12 and the cooking grill 30.

The cover member 40 preferably comprises a general concave configuration having an internal dimensional periphery sufficient for supporting the second cooking environment 48, as best shown in FIG. 1. In one presently preferred embodiment, the dimensional height of the cover member 40 at its highest point is between approximately 10 cm and 20 cm, and preferably about 15 cm. It will be readily appreciated by those skilled in the art, however, that other dimensional sizes of the cover member 40 are possible. It is intended, therefore, that the example provided herein be viewed as exemplary of the principles of the present invention, and not as restrictive to a particular structure for implementing those principles.

To assist in selectively positioning the cover member 40 in supportable relation to the second support ridge 26 of the base unit 12, a handle member 44 may be provided. In one presently preferred embodiment, the handle member 44 may be integrally formed on the exterior surface of the cover member 40. Functionally, the handle member 44 comprises a configuration sufficient for providing means for gripping by a user. It will be apparent that other mechanisms may be constructed in accordance with the inventive principles set forth herein. For example, the handle member 44 may comprise a pivotal, U-shaped member having opposing ends securely fastened to the body of the cover member 40. Accordingly, those skilled in the art will readily recognize other possible modifications and adaptations which are consistent with the spirit and scope of the present invention.

As noted above, the selective positioning of the cover member 40 in relation to the base unit 12 may include the securing of a locking lip 28 formed along the edge of the upper perimeter of base unit 12. Structurally, the locking lip 28 provides means for securing the cover member 40 in relation to the base unit 12. In this regard, securing the cover member 40 in relation to the base unit 12 may facilitate a sealed second cooking environment 48 for preparing food items therein.

Another presently preferred embodiment of the utensil supporting multiple cooking environments for preparing foods of the present invention, designated generally at 110, is best illustrated in FIGS. 4, 5, 6 and 7. As shown, the cooking utensil 110 is preferably formed including a cooking grill 150 and a cover member 140. The cooking utensil 110 preferably supports at least two environments 180, 182 for preparing various food items. In one presently preferred embodiment, the structural components of the cooking utensil 110 (e.g., the cooking grill 150 and the cover member 140) are preferably formed having an overall dimensional size and shape that is sufficient for being introduced within the internal periphery of a conventional gas or electric oven, stove or microwave. Consistent therewith, the cooking to utensil 110 may be formed of a sufficiently sturdy material capable of underdoing elevated temperatures and/or microwave energy.

Figure 4:
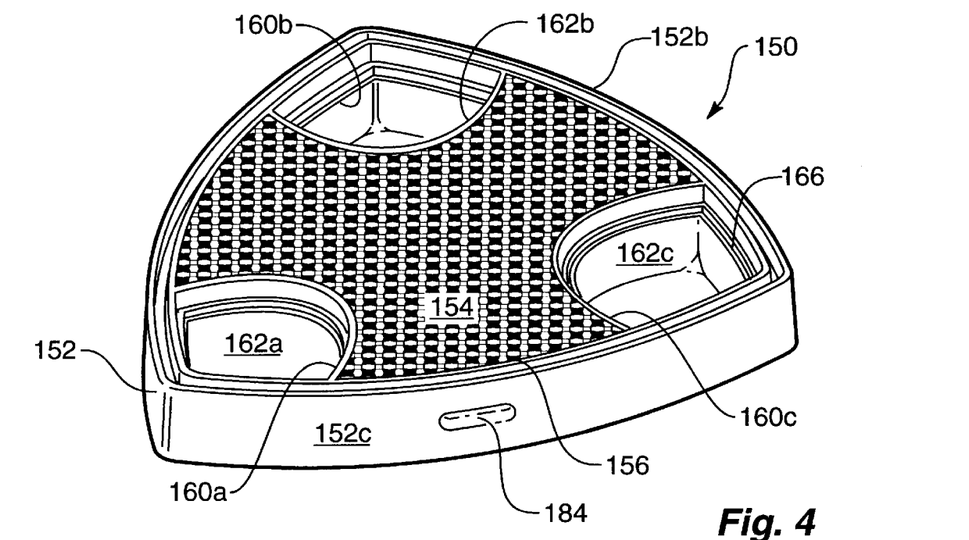
FIG. 4 is a perspective view of yet another presently preferred embodiment of a utensil supporting multiple cooking environments for preparing foods.

For example, the various components of the cooking, utensil 110 may be formed of ceramic (e.g., Corningware™), glass (e.g., Pyrex™), or a polymeric material sufficient for resisting degradation at elevated temperatures and/or exposure to microwave energy (e.g., a thermoset polyester or any of numerous other organic, synthetic or processed materials that are mostly thermoplastic or thermosetting polymers of high molecular weight with or without additives, such as, plasticizers, auto oxidants, colorants, or fillers, which can be shaped, molded, cast, extruded, drawn, foamed or laminated into objects, films, or filaments transparent to microwave energy).

In one presently preferred embodiment, the structural components of the cooking utensil 110 (e.g., the cooking grill 150 and the cover member 140) is formed comprising a general triangular configuration. Although the alternate embodiment of the present invention is illustrated and described in connection with a general triangular configuration, those skilled in the art will recognize that various other geometrical configurations are likewise suitable, such as, for example, circular, rectangular, square, oblong, etc., which are consistent with the spirit and scope of the present invention and thereby contemplated herein. The use of a general triangular configuration is thus by way of illustration only and not intended to be by way of limitation.

Figure 5:
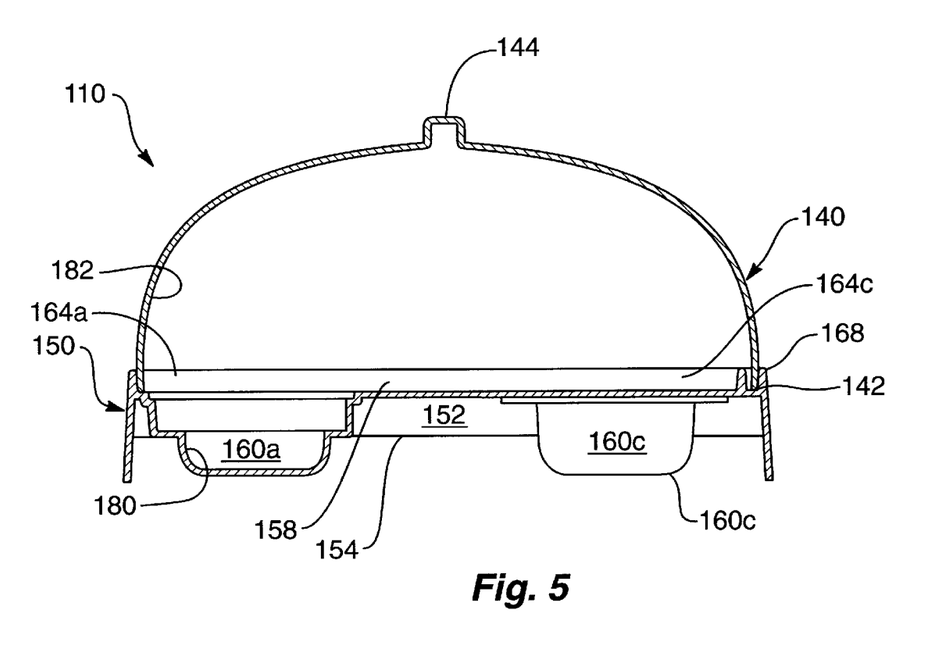
FIG. 5 is a cross-sectional view of one presently preferred embodiment of a cover member supportably disposed in relation to one presently preferred embodiment of a cooking grill, in accordance with the cooking utensil as shown in FIG. 4.

As best illustrated in FIGS. 4 and 5, the cooking grill 150 is preferably formed comprising an upper cooking surface 156, a collection reservoir 158 disposed beneath at least a portion of the upper cooking surface 156, and one or more cooking compartments 160. In one presently preferred embodiment, the cooking grill 150 includes a first side wall 152a, a second side wall 152b and a third side wall 152c disposed perpendicular to a surface flooring 154. In relationship to each other, the side walls 152a, 152b, 152c form the outer perimeter of the collection reservoir 158 of the cooking grill 150, wherein the surface flooring 154 provides a bottom surface.

The cooking grill 150 includes at least one cooking compartment 160 having a dimensional size and shape sufficient for introducing and retaining one or more food items therein. In one presently preferred embodiment of the present invention, three separate and distinct cooking compartments 160a, 160b, 160c are formed at the angular corners of the cooking grill 150 having a general triangular shape, as disclosed above. Each of the cooking compartments 160a, 160b, 160c are partitioned from the internal periphery of the collection reservoir 158 by a periphery wall 162a, 162b, 162c, respectively. In preferred design, each of the periphery walls 162a, 162b, 162c project substantially upward from the surface flooring 154 of the cooking grill 150 to a dimensional height not extending beyond a first support ridge 166 of the cooking grill 150.

Figure 6:
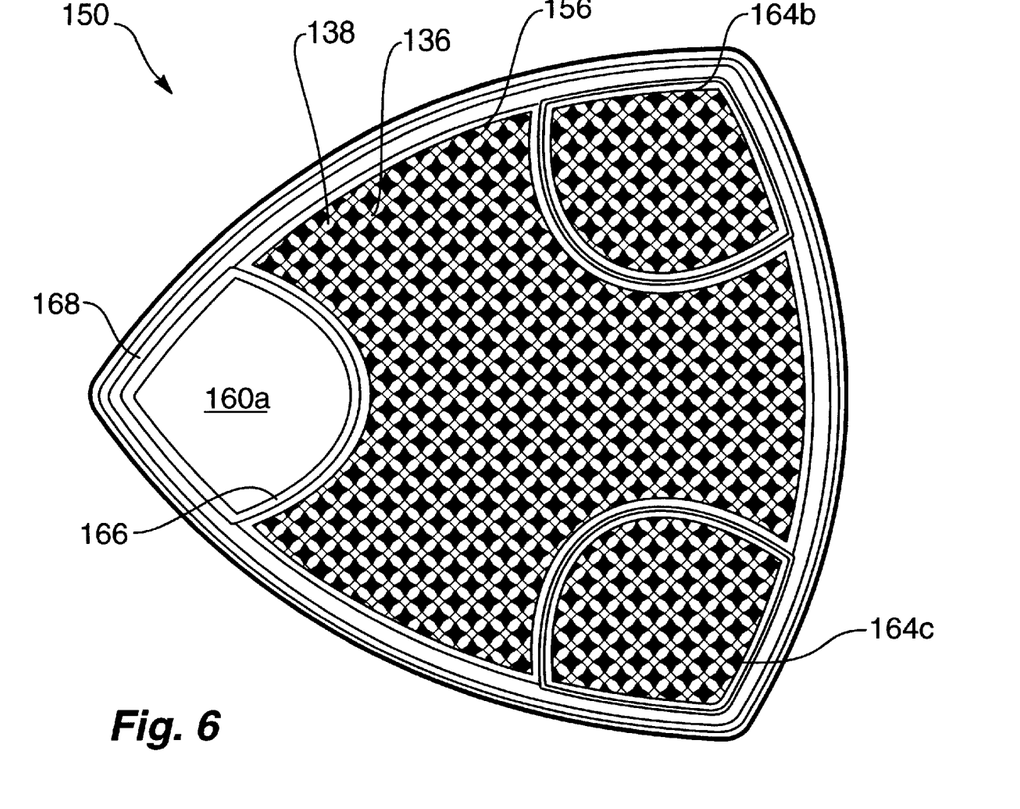
FIG. 6 is a top plan view of one presently preferred embodiment of an upper cooking surface of the cooking grille, whereby illustrating an open cooking compartment for introducing food item(s) therein.

Referring now to FIGS. 4 and 6, the periphery wall 162a of the first cooking compartment 160a is formed having a general arcuate shape and including opposing ends that engage the respective side walls 152a, 152c of the cooking grill 150. The periphery wall 162b of the second cooking compartment 160b is formed having a general arcuate shape and including opposing ends that engage the respective side walls 152a, 152b of the cooking grill 150. In addition, the periphery wall 162c of the third cooking coinpartment 160c is formed having a general arcuate shape and including opposing ends that engage the respective side walls 152b, 152c of the cooking grill 150.

Although the present invention is illustrated and described in connection with general arcuate shaped periphery walls 162a, 162b, 162c of the three cooking compartments 160a, 160b, 160c, those skilled in the art will recognize that various other geometrical configurations are likewise possible. The use of general arcuate shaped periphery walls 162a, 162b, 162c is thus by way of illustration only and not by way of limitation.

Preferably, each of the cooking compartments 160a, 160b, 160c of the cooking grill 150 are formed having a dimensional periphery sufficient for introducing and retaining one or more food items therein. Structurally, each ot the cooking compartments 160a, 160b, 160c provide means for isolating one or more food items and its respective juices contained therein from mixing with foods contained in the other cooking compartments. For example, meats, vegetables, fruits, cereals, etc. may be introduced into the respective cooking compartments 160a, 160b, 160c to be prepared for consumption. Additionally, an egg may be introduced into the internal periphery of a cooking compartment 160 for the purpose of pouching the egg.

As noted above, the cooking grill 150 includes an upper cooking surface 156 and a collection reservoir 158 disposed beneath at least a portion of the upper cooking surface 156. In one presently preferred embodiment, as best illustrated in FIG. 4, the internal periphery of the collection reservoir 158 is defined along its perimeter by the side walls 152a, 152b, 152c and each of the periphery walls 162a, 162b, 162c of the three cooking compartments 160a, 160b, 160c, respectively.

As illustrated in FIG. 6, disposed along the surface facing of the upper cooking surface 156 of the cooking grill 150 is a plurality of openings 136. In cooperation with the plurality of openings 136, collection channels 138 may be formed in the upper cooking surface 156 to provide means for feeding run-off liquids (e.g., water, oil, grease, etc.) through the openings 136 and into the underlying collection reservoir 158 of the cooking grill 150. Functionally, the collection reservoir 158 of the cooking grill 150 provides means for collecting run-off liquids extracted from food item(s) positioned on or suspended above the upper cooking surface 156 of the cooking grill 150. The liquids generally flow by way of gravity into the collection channels 138 which tend to divert the fluid flow through the openings 136 formed in the upper cooking surface 156 of the cooking grill 150 and into the collection reservoir 158 for accumulation.

Figure 7:
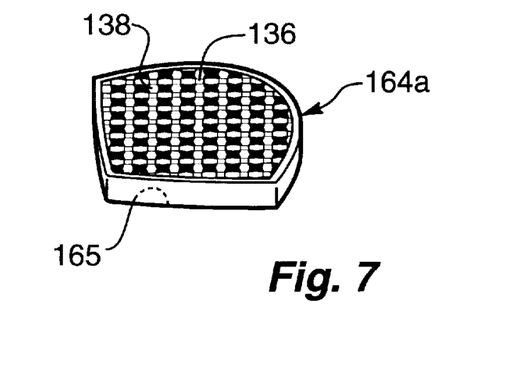
FIG. 7 is a perspective view of one presently preferred embodiment of a containment lid of one presently preferred embodiment of the cooking grill of the present invention.

Referring now to FIGS. 6 and 7, a containment lid 164 is formed having an outer perimeter comprising a dimensional size and shape sufficient for selectively sealing a respective cooking compartment 160 of the cooking grill 150. In one presently preferred embodiment of the cooking utensil 110 of the present inventions the cooking grill 150 comprises three containment lids 164a, 164b, 164c for selectively sealing the cooking compartments 160a, 160b, 160c, respectively. Each of the containment lids 164a, 164b, 164c are preferably formed having an upper cooking surface that comprises openings 136 formed along its surface facing. In cooperation with the openings 136, collection channels 138 may be formed in the upper surface of the containment lids 164 to facilitate means for feeding run-off liquids (e.g., water, oil, grease, etc.) through the openings 136 formed in the upper surface and into the underlying collection chamber 165 of the containment lid 164. Functionally, the collection chamber 165 of the cooking grill 150 provides for collecting run-off liquids extracted from food item(s) positioned on or suspended above the upper cooking surface of the containment lid 164. The liquids generally flow by way of gravity into the collection channels 138 which tend to divert the fluid flow through the openings 136 and into the collection chamber 165 of the respective containment lid 164.

A first support ridge 166 of the cooking grill 150 provides means for supporting each of the containment lids 160 is supportable relation to the respective cooking compartment 160, as best illustrated in FIGS. 4, 6 and 7. In this regard, the first support ridge 166 preferably comprises an outer perimeter having a dimensional size and shape sufficient for selectively supporting each of the containment lids 160 in supportable relation to the cooking grill 150.

When selectively disposed over the internal periphery of the cooking compartments 160, each of the containment lids 164 facilitate a first sealed environment 180 within the internal periphery of each of the respective cooking compartments 160, as best shown in FIG. 5. The air generally sealed within the cooking compartments 160 may circulate around the food item(s) disposed therein, thus providing means for preparing the various food items for consumption. For purposes of this description, the first cooking environment 180 may facilitate, but is not intended to limited to, an environment for preparing foods by means of baking, roasting, broiling and/or sauteing.

Referring now to FIGS. 4 and 5, a second support ridge 168 provides means for selectively supporting the cover member 140 in supportable relation to the cooking grill 150. The second support ridge 168 preferably comprises an outer perimeter having a dimensional size and shape sufficient for supporting a flange 142 of the cover member 140. As appreciated, the second support ridge 168 is formed having an outer perimeter that is larger than the outer perimeter of the first support ridge 166 that selectively supports the containment lids 164 of the cooking compartments 160. In one presently preferred embodiment of the present invention, the cover member 140 is preferably formed having a general triangular configuration so as to substantially correspond with the general triangular configuration of the cooking grill 150.

Preferably, the cover member 140 comprises a general concave configuration having an internal dimensional periphery sufficient for supporting the second cooking environment 182, as best illustrated in FIG. 5. In one presently preferred embodiment, the dimensional height of the cover member 140 at its highest point is between approximately 10 cm and 20 cm, and preferably about 15 cm. It will be readily appreciated by those skilled in the art, however, that other dimensional sizes of the cover member 140 are possible. It is intended, therefore, that the examples provided herein be viewed as exemplary of the principles of the present invention, and not as restrictive to a particular structure for implementing those principles.

To assist in selectively positioning the cover member 140 in supportable relation to the second support ridge 168 of the cooking grill 150, a handle member 144 may be provided, as best illustrated in FIG. 5. In one presently preferred embodiment, the handle member 144 may be integrally formed on the exterior surface of the cover member 140. Structurally, the handle member 144 may comprise a configuration sufficient for providing means for gripping by a user. It will be apparent that other gripping mechanisms may be constructed in accordance with the inventive principles set forth herein. For example, the handle member 144 may comprise a pivotal, U-shaped member having opposing ends securely fastened to at least a portion of the outer body of the cover member 140. Accordingly, those skilled in the art will readily recognize other possible modifications and adaptations which are consistent with the spirit and scope of the present invention.

Referring now to FIGS. 1 and 4, a recess 76, 176 may be formed in one or more of the opposing side walls 14a, 14b, 14c of the base unit 12 or one or more opposing side walls 152a, 152b, 152c of the cooking grill 150, respectively, to provide means for gripping the cooking utensil 10, 110 of the present invention. The recess 76, 176 is preferably formed having an internal surface area being sufficient dimensionally to allow the insertion of one or more fingers of a user therein so as to provide means for gripping the base unit 12 or the cooking grill 150, respectively. It will be apparent that other mechanisms may be constructed in accordance with the inventive principles set forth herein. For example, conventional handle members may be attached along one or more side walls 14, 153 of the base unit 12 or the cooking grill 150, respectively, to facilitate the maneuverability of the present invention. It is intended, therefore, that the example provided herein be viewed as exemplary of the principles of the present invention, and not as restrictive to a particular structure for implementing those principles.

Although numerous variations or techniques are available for cooking with the present invention, one presently preferred method for preparing foods using the utensil supporting multiple cooking environments 10, 110 may comprise the steps of (1) introducing at least one food item within one or more cooking compartments 20, 160, each of the cooking compartments 20, 160 having an internal periphery sufficient for receiving said food item and being partitioned from the other cooking compartments, (2) selectively positioning a cooking grill 30, 150 over said internal periphery of said cooking compartments 20, 160 to facilitate a first cooking environment 46, 180 for preparing said food items within the compartments, the cooking grill 30, 150 comprising an upper cooking surface 32, 156 and a collection reservoir 34, 158 disposed beneath at least a portion of the upper cooking surface 32, 156, and (3) disposing one or more food items in relation to the upper cooking surface 32, 156 of the cooking grill 30, 150, wherein the upper cooking surface 32, 156 facilitates a second cooking environment 48, 182 for preparing the food item(s) positioned on or suspended above the upper cooking surface 32, 156 for consumption. In addition, a cover member 40, 140 may be selectively disposed in supportable relation to the cooking grill 30, 150 to provide means for substantially sealing the second cooking environment 48, 182. Upon assembly, the cooking utensil 10, 110 of the present invention provides means for simultaneously supporting at least two cooking environments for the preparation of food items.

From the above discussion, it will be appreciated that the present invention contemplates a utensil supporting multiple cooking environments for preparing foods, thereby facilitating at least two cooking environments for preparing various food items using a single cooking implement.

Consistent with the foregoing, the present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All chances which come within the meaning, and range of equivalency of the claims are to be embraced within their scope.

What is claimed and desired to be secured by United States Letters Patent is:

1. A cooking utensil, comprising:
   a cooking grill having an upper cooking surface and a collection reservoir disposed beneath at least a portion of said upper cooking surface;
   said upper cooking surface of said cooking grill supporting a first cooking environment;
   at least two cooking compartments disposed in relation to said cooking grill, each of said cooking compartments partitioned from the other by a separating wall, wherein each of said cooking compartments including an internal periphery that is dimensionally sufficient for selectively introducing at least one food item therein;
   each of said cooking compartments supporting a second cooking environment distinguishable from said first cooking environment.

2. A cooking utensil as defined in claim 1 further comprising a cover member selectively disposed in supportable relation to said cooking grill.

3. A cooking utensil as defined in claim 2 wherein said cover member is formed having a general concave configuration.

4. A cooking utensil as defined in claim 2 wherein said cover member includes a handle.

5. A cooking utensil as defined in claim 1 wherein said upper cooking surface comprises a plurality of openings.

6. A cooking utensil as defined in claim 5 wherein said openings provide means for passing liquids into said collection reservoir.

7. A cooking utensil as defined in claim 5 further comprising a plurality of collection channels formed in relation to said openings.

8. A cooking utensil as defined in claim 1 wherein said collection reservoir comprises at least three side walls and a surface flooring.

9. A cooking utensil, comprising:
   a cooking grill having an upper cooking surface and a collection reservoir disposed beneath at least a portion of said upper cooking surface;
   said upper cooking surface of said cooking grill supporting a first cooking environment;
   at least two cooking compartments disposed in relation to said cooking grill, each of said cooking compartments partitioned from the other by a separating wall, wherein each of said cooking compartments including an internal periphery that is dimensionally sufficient for selectively introducing at least one food item therein;

each of said cooking compartments supporting a second cooking environment distinguishable from said first cooking environment; and a cover member selectively disposed in supportable relation to said cooking grill.

10. A cooking utensil as defined in claim 9 further comprising a support assembly for supporting a food item above said upper cooking surface.

11. A cooking, utensil as defined in claim 10 wherein said support assembly comprises a support aperture formed in said upper cooking surface and a support rod having a first end adapted to be selectively disposed in supportable relation to said support aperture.

12. A cooking utensil as defined in claim 9 wherein said upper cooking surface comprises a plurality of openings.

13. A cooking utensil as defined in claim 12 wherein said openings provide means for passing liquids into said collection reservoir.

14. A cooking utensil as defined in claim 12 further comprising a plurality of collection channels formed in relation to said openings.

15. A cooking utensil as defined in claim 9 wherein said collection reservoir comprises at least three side walls and a surface flooring.

16. A cooking utensil as defined in claim 9 wherein said separating wall comprises two opposing ends adapted to engage at least two side walls of the collection reservoir, respectively.

17. A cooking utensil as defined in claim 9 wherein said cover member is formed having a general concave configuration.

18. A cooking utensil as defined in claim 9 wherein said cover member comprises a handle.

\* \* \* \* \*